United States Patent
Ahmed

(10) Patent No.: US 9,915,526 B2
(45) Date of Patent: Mar. 13, 2018

(54) METHOD AND A DEVICE FOR SURFACE DETERMINATION BY MEANS OF MICROWAVES

(71) Applicant: Rohde & Schwarz GmbH & Co. KG, Munich (DE)

(72) Inventor: Sherif Ahmed, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 447 days.

(21) Appl. No.: 14/765,936

(22) PCT Filed: Jan. 23, 2014

(86) PCT No.: PCT/EP2014/051334
§ 371 (c)(1),
(2) Date: Aug. 5, 2015

(87) PCT Pub. No.: WO2014/118078
PCT Pub. Date: Aug. 7, 2014

(65) Prior Publication Data
US 2015/0377616 A1    Dec. 31, 2015

(30) Foreign Application Priority Data
Jan. 30, 2013  (DE) .............. 10 2013 201 469

(51) Int. Cl.
*G01S 13/89* (2006.01)
*G01B 15/04* (2006.01)
*G01S 13/88* (2006.01)

(52) U.S. Cl.
CPC ............ *G01B 15/04* (2013.01); *G01S 13/887* (2013.01); *G01S 13/89* (2013.01)

(58) Field of Classification Search
CPC ......... E02F 9/18; E02F 9/2217; E02F 9/2264; E02F 9/2271; G01B 15/04; G01S 13/887; G01S 13/89
(Continued)

(56) References Cited

U.S. PATENT DOCUMENTS 6,965,340 B1    11/2005  Baharav et al.

FOREIGN PATENT DOCUMENTS

DE    102012207186 A1    10/2013
DE    102010014795 A1     7/2014
(Continued)

OTHER PUBLICATIONS

Ahmed, et al., "A Novel Fully Electronic Active Real-Time Imager Based on a Planar Multistatic Sparse Array", IEEE Transactions on Microwave Theory and Techniques, vol. 59, No. 12, Dec. 2011.
(Continued)

*Primary Examiner* — Timothy A Brainard
(74) *Attorney, Agent, or Firm* — Potomac Technology Law, LLC

(57) ABSTRACT

An apparatus comprises: (1) measuring unit configured to transmit a signal towards the object and to determine a plurality of voxels, each comprising phase and magnitude of a reflected signal and spatial coordinates (comprising Z-axis, X-axis and Y-axis), and the voxels comprise a plurality of series of voxels along the Z-axis, each having a same X-coordinate and a same Y-coordinate; and (2) surface-determining unit comprising (a) magnitude unit configured to determine a maximum magnitude voxel for each series of voxels, (b) phase unit configured to determine, for each maximum magnitude voxel, phases of at least three voxels (maximum magnitude voxel and voxels adjacent thereto), (c) angle unit configured to determine, for each maximum magnitude voxel, a normal vector based on the respective
(Continued)

phases, and (d) reconstructing unit configured to determine the object surface based on the spatial coordinates of the maximum magnitude voxels and the respective normal vectors.

17 Claims, 4 Drawing Sheets

(58) Field of Classification Search
USPC .......................................................... 342/22
See application file for complete search history.

(56) References Cited

FOREIGN PATENT DOCUMENTS

| EP | 0994443 A2 * | 4/2000 | ............. G06T 15/08 |
|----|--------------|--------|--------------------------|
| EP | 0994443 A2 | 4/2000 | |
| EP | EP1247070 B1 | 10/2007 | |

OTHER PUBLICATIONS

Ahmed, et al., "Automatic Detection of Concealed Dielectric Objects for Personnel Imaging", IEEE MTT-S International Workshop on Wireless Sensing, Local Positioning and RFID, IMWS 2009—Croatia, 2009.

Hagberg, et al., "Calibration of Interferometric SAR Images", EARSeL Advances in Remote Sensing, vol. 4, No. 2-X, 1995.

EPO, "International Preliminary Report on Patentability (English Translation)", PCT/EP2014051334, dated Aug. 13, 2015.

\* cited by examiner

METHOD AND A DEVICE FOR SURFACE DETERMINATION BY MEANS OF MICROWAVES

PRIORITY

The present application is a U.S. national phase application under 35 U.S.C. § 371 of PCT application No. PCT/EP2014/051334 (filed Jan. 23, 2014), which claims priority to German Patent Application No. DE 102013201469.4 (filed Jan. 30, 2013), the entireties of which are hereby incorporated by reference herein.

FIELD

The invention relates to a device and a method for the measurement of surfaces of objects under investigation.

BACKGROUND

Optical scanners are conventionally used for the measurement of surfaces. However, these are extremely effort-intensive and therefore cost-intensive. They can also detect only the outermost surface of an object. Furthermore, microwave-based methods are known, which, however, demand very effort-intensive optimization processes in order to achieve reliable information.

For example, European Patent EP 1 247 070 B1 discloses a method for surface measurement by means of microwaves which employs the effort-intensive Phase Unwrapping.

SUMMARY

Embodiments of the present invention, therefore, provide a device and a method which allow a reliable and accurate surface measurement without expensive hardware and without major computational effort.

In accordance with example embodiments, a device serves for the measurement of a surface of an object under investigation. It contains a measuring unit which is embodied to transmit a measurement signal in the direction towards the object under investigation and, on the basis of a resulting, reflected signal, to determine a plurality of voxels, which each contain a phase and a magnitude of the reflected signal and a spatial coordinate. Furthermore, it contains a surface-determining unit. In this context, the spatial coordinates provide a Z-axis which corresponds to a depth within the object under investigation, and an X-axis and a Y-axis which are disposed perpendicular to the Z-axis. The surface-determining unit provides a magnitude-determining unit for the determination of voxels of maximum magnitude among voxels with identical X-coordinate and identical Y-coordinate, a phase-determining unit for the determination of the phases of each of at least three voxels, wherein the at least three voxels are the voxel of maximum magnitude and/or adjacent voxels, an angle-calculating unit for the determination of a normal vector of each voxel of maximum magnitude from the respective phases and a surface-reconstructing unit for the determination of the surface of the object under investigation from the spatial coordinates of the voxel of greatest magnitude and the associated normal vectors. Accordingly, the position and inclination of the surface of the object under investigation can be determined with low effort.

In this context, the adjacent voxels used are adjacent in the X-direction and/or in the Y-direction relative to the respective voxel of maximum magnitude. Accordingly, the phase information is comparable.

According to further embodiments, the phase-determining unit is configured to determine the phases of each of at least two voxels adjacent in the X-direction and/or in the Y-direction and of the respective voxel of maximum magnitude. Alternatively, it is configured to determine the phases of each of at least four voxels adjacent in the X-direction and/or in the Y-direction relative to the respective voxel of maximum magnitude. In this manner, the normal vector can be determined with minimum effort.

According to further embodiments, the surface-determining unit is configured to determine the phases of more than three voxels. The angle-calculating unit is then configured to determine more than one provisional normal vector and to determine the normal vector from the provisional normal vectors. In this manner, the accuracy of the measurement of the normal vector can be increased.

According to a further embodiment, the device provides a display unit which is configured to display the determined surface of the object under investigation in color, wherein each direction of the normal vectors of all voxels of the surface is represented by a different color. Accordingly, a user can very easily recognize the three-dimensional structure of the surface. In particular, an identification of foreign bodies or defects is therefore very simple.

According to a further embodiment, the device provides a control unit which is configured to detect surface anomalies on the basis of the surface determined and on the basis of the phases determined for the individual voxels. Accordingly, with minimal user effort, the user can determine anomalies under investigation, which correspond, for example, to foreign bodies or defects.

According to a further embodiment, in calculating the normal vectors, the angle-calculating unit takes into consideration previously specified maximum angles of inclination of the surface of the object under investigation. The computational effort of the angle-calculating unit can be significantly reduced in this manner.

In accordance with further example embodiments, a method serves for the measurement of a surface of an object under investigation. A measurement signal is transmitted in the direction towards the object under investigation and, on the basis of a resulting reflected signal, a plurality of voxels is determined, which each contain a phase and a magnitude of the reflected signal and a spatial coordinate. In this context, the spatial coordinates provide a Z-axis which corresponds to a depth within the object under investigation, and an X-axis and a Y-axis which are disposed perpendicular to the Z-axis. Voxels of maximum magnitude are determined among voxels with identical X-coordinate and identical Y-coordinate. Phases of each of at least three voxels are determined, wherein the at least three voxels are the voxel of maximum magnitude and/or adjacent voxels. A normal vector of the voxel of maximum magnitude is determined from the respective phases. A surface of the object under investigation is determined from the spatial coordinates of the voxel of maximum magnitude. Accordingly, the position and inclination of the surface of the object under investigation can be determined with low effort.

BRIEF DESCRIPTION OF THE DRAWINGS

In the following, embodiments of the invention are described by way of example with reference to the drawings in which such embodiments are illustrated. The drawings show.

DETAILED DESCRIPTION

Initially, the construction and the functioning of an exemplary embodiment of the measuring device according to the invention will be explained roughly with reference to FIG. 1. Following this, the functioning of a further exemplary embodiment of the measuring device according to the invention will be explained in greater detail with reference to FIG. 2. Some further details of the functioning of an exemplary embodiment of the measuring device according to the invention and of an exemplary embodiment of the method according to the invention will then be explained on the basis of FIG. 3. Finally, with reference to FIG. 4, the functioning of an exemplary embodiment of the method according to the invention will be explained in detail. The presentation and description of identical elements in similar drawings has not been repeated in some cases.

Figure 1:
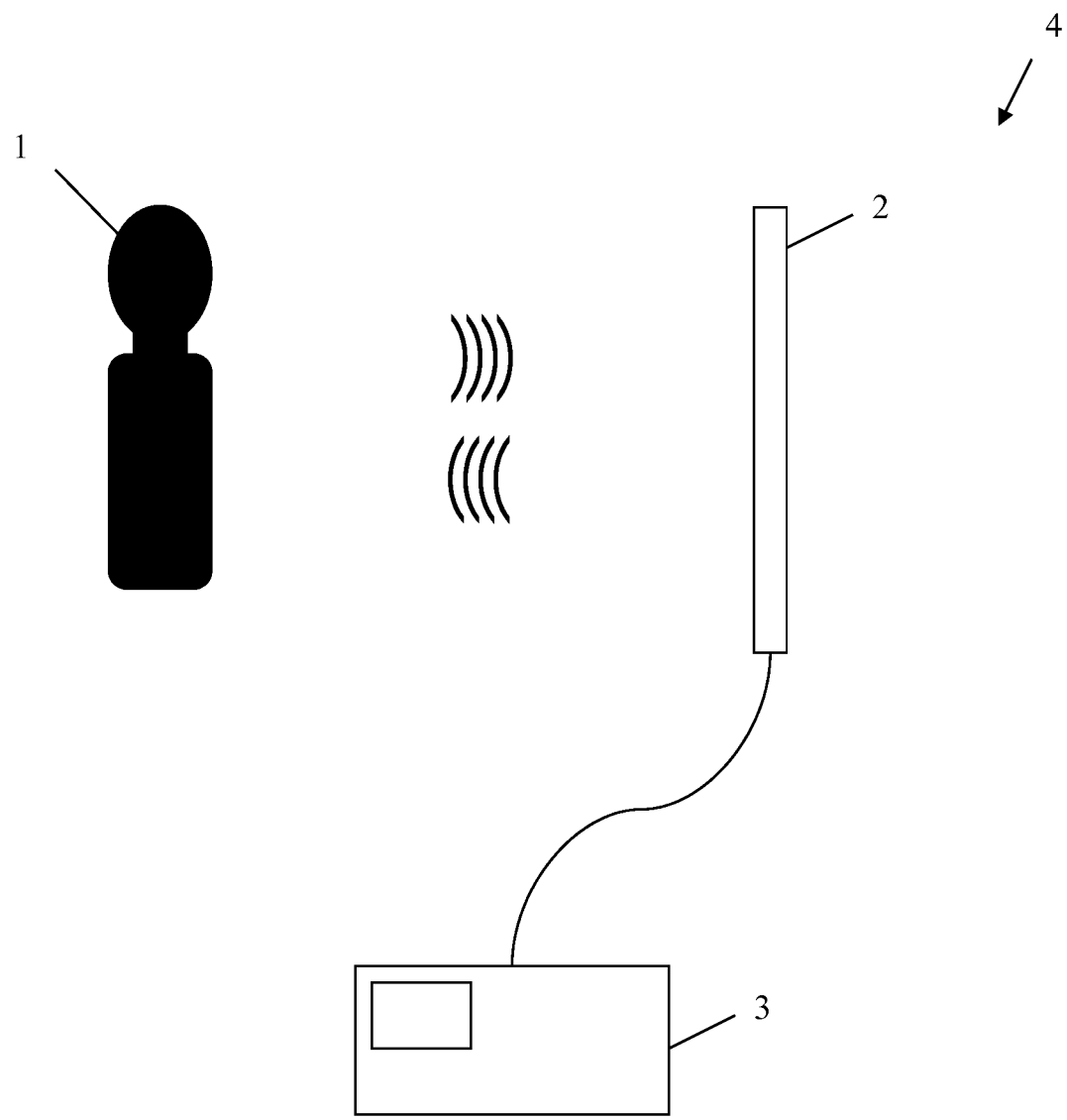
FIG. 1 an overview of a first exemplary embodiment of the measuring device according to the invention.

FIG. 1 shows a first exemplary embodiment of the measuring device 4 according to the invention. The measuring device 4 comprises an antenna arrangement 2 and a measuring-device housing 3. The antenna arrangement 2 is arranged near to an object under investigation 1. In this context, the object under investigation 1 is, for example, a person's upper body. The measuring device 4 can thus be used to detect concealed foreign bodies, for example, a weapon on a person's body. However, the measuring device is not restricted to use with a person as the object under investigation. For example, it can be used equally well to measure inanimate objects. For instance, a use in material testing is possible.

By means of the antenna arrangement 2, the measuring device 4 charges the object under investigation 1 with a signal, preferably a microwave signal. A signal reflected from the object under investigation 1 is then picked up by the antenna arrangement 2 and further processed by the measuring device 4. By preference, signals of different frequencies are transmitted in succession or simultaneously by means of the antenna arrangement 2 in the direction towards the object under investigation. This serves to increase the resolution and at the same time to reduce ambiguities in the measurement results. The antenna arrangement 2 illustrated here provides a plurality of antennas, each of which as a transmitting/receiving antenna. Alternatively, separate transmitting antennas and receiving antennas can be used. These should be arranged in such a manner that signals reflected from the object under investigation reach the receiving antennas.

Furthermore, the use of a transmissive measurement, that is, a measurement radiating through an object under investigation, is also conceivable. In this case, transmitting antennas and receiving antennas should be arranged in such a manner that the object under investigation 1 is disposed between them.

Figure 2:
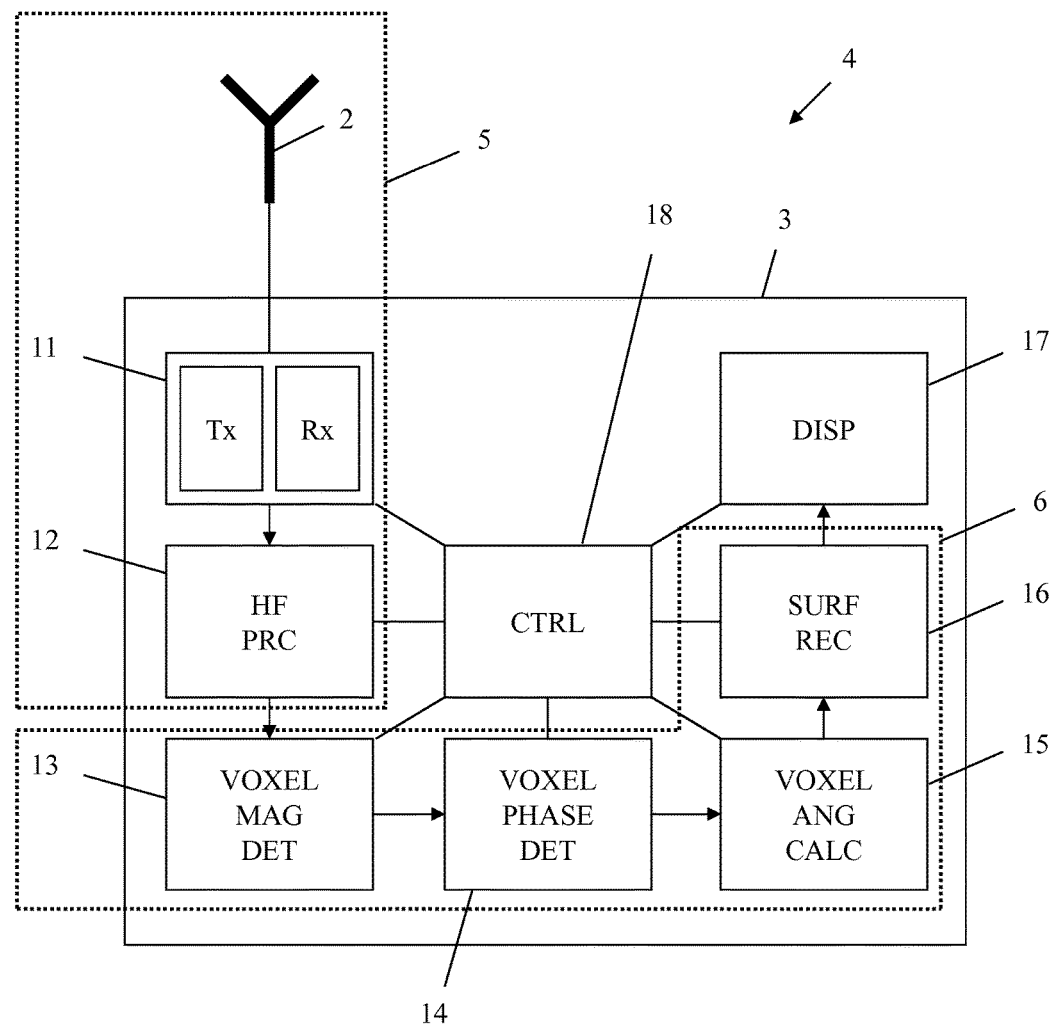
FIG. 2 a block-circuit diagram of a second exemplary embodiment of the measuring device according to the invention.

FIG. 2 shows a second exemplary embodiment of the measuring device 4 according to the invention. The measuring device 4 contains an antenna arrangement 2 which is arranged outside the measuring-device housing 3. Furthermore, the measuring device 4 contains a measuring unit 5 which contains the said antenna arrangement 2, a transmitting/receiving unit 11 and a high-frequency processor 12. This transmitting/receiving unit 11 is embodied to charge the object under investigation 1 with signals by means of the antenna arrangement 2 and to register the signals passing through the object under investigation or respectively signals reflected from the object under investigation by means of the antenna arrangement 2. This transmitting/receiving unit 11 is connected to the high-frequency processor 12 and transmits the measured results to the high-frequency processor 12. From the measured results, the high-frequency processor 12 determines data of voxels, which correspond to volume elements in three-dimensional space. The data of each voxel contains a phase and a magnitude of the reflected or respectively transmitted signals and a corresponding spatial coordinate.

The high-frequency processor 12 accordingly determines the data of the voxels in such a manner that a Z-coordinate corresponds to a depth within the object under investigation 1. In this context, an X-coordinate and a Y-coordinate are determined in such a manner that they are each disposed perpendicular to one another and to the Z-coordinate. The precise method for the reconstruction of these data will not be discussed at this point because it relates to a conventional technical method.

Furthermore, the measuring device 4 contains a surface-determining unit 6. The surface-determining unit 6 contains a magnitude-determining unit 13, a phase-determining unit 14, an angle-calculating unit 15 and a surface-reconstructing unit 16.

The results from the high-frequency processor 12 are supplied to the magnitude-determining unit 13. In each case, this magnitude-determining unit 13 determines voxels of maximum magnitude with identical X-coordinate and identical Y-coordinate. That is, for every series of voxels along the Z-axis, the voxel of maximum magnitude is determined. This is repeated for all series of voxels along the Z axis. This voxel of maximum magnitude is registered as the surface of the object under investigation at the point specified by the X-coordinate and the Y-coordinate.

The result from the magnitude-determining unit 13 is supplied to the phase-determining unit 14. The phase-determining unit 14 now determines phases of each of at least three voxels, wherein the at least three voxels are the voxel of maximum magnitude and/or horizontally, vertically and/or diagonally adjacent voxels. Accordingly, in the simplest case, the phase of the voxel of maximum magnitude and the phase of the voxel adjacent in the X-direction and/or in the Y-direction is determined.

Alternatively, the phases of four voxels which are adjacent in the X-direction and/or in the Y-direction to the voxel of maximum magnitude can also be determined. Furthermore, the phases of more than four of these voxels can be determined. This step is repeated for each of the voxels of maximum magnitude.

The results of the phase-determining unit 14 are then supplied to the angle-calculating unit 15. For each of the voxels of maximum magnitude determined by the magnitude-determining unit 13, the angle-calculating unit 15 calculates a normal vector of the surface. For this purpose, angles are calculated from the phases of the voxels of maximum magnitude or respectively of the adjacent voxels, and these are converted into a normal vector.

The precise function of the magnitude-determining unit 13, the phase-determining unit 14 and the angle-calculating unit 15 will be described in greater detail with reference to FIG. 3.

The determined normal vectors of the voxels of maximum magnitude determined by the magnitude-determining unit 13 are then supplied to the surface-reconstructing unit 16. This determines a surface of the object under investigation from the normal vectors and the spatial coordinates of the voxels of maximum magnitude. The determined surface is then supplied to a display unit 17 which also forms part of the measuring device 4.

Furthermore, a control unit 18 which is connected to all of the other components and controls them forms a part of the measuring device 4. Moreover, the control unit 18 is embodied to detect surface anomalies on the basis of the surface determined by the surface-reconstructing unit 16 and/or on the basis of the phases determined by the phase-determining unit 14. These are characterized by sudden phase jumps and accordingly changes in the direction of the normal vector along the surface. Accordingly, for example, in the case of a use in security checks, the presence of a foreign body on the surface of the body of a person under investigation can be detected. Alternatively, when using this method for a surface analysis, a surface anomaly, such as paint damage, can be identified.

Figure 3:
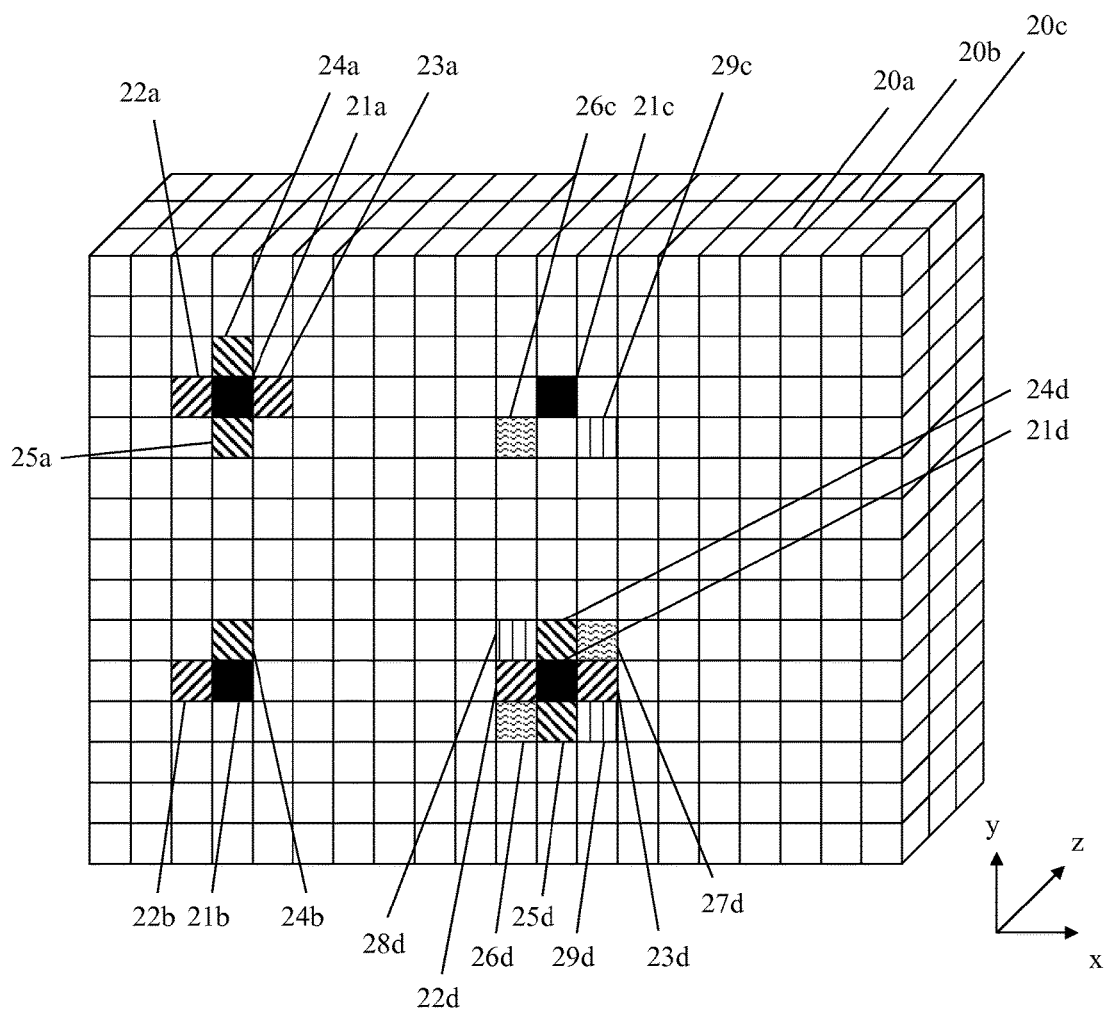
FIG. 3 a display of the voxels of a measurement result from an exemplary embodiment of the measuring device according to the invention.

Now, FIG. 3 shows a plurality of voxels as the result from the measuring unit 5 of FIG. 2. The Z-axis in this context corresponds to a depth within the object under investigation 1 from FIG. 1. The Y-axis and the X-axis stand perpendicular to one another and to the Z axis. In this context, three voxel planes 20a, 20b and 20c are illustrated one behind the other along the Z-axis. For the sake of visual clarity, the voxels of maximum magnitude are not illustrated here. However, four alternatives for the selection of the voxels to be used for the phase determination by the phase-determining unit 14 from FIG. 2 are shown side-by-side in the voxel plane 20a. Voxels 22a and 23a adjacent along the X-axis are shown around a central voxel 21a. Furthermore, voxels 24a and 25a adjacent along the Y-axis are shown. Now, in order to determine the normal vector of the voxel of maximum magnitude 21a, the phases of the voxels 22a and 23a adjacent along the X-axis are determined. Furthermore, the phases of the voxels 24a and 25a adjacent along the Y-axis are determined.

In each case, if the phases of the adjacent voxels are used, two angles are obtained which can be calculated to form a normal vector. However, if the phase of the voxel of maximum magnitude 21a is additionally used, four angles and therefore an over-determination of the normal vector is obtained. This redundancy can be exploited by the angle-calculating unit 15 in order to compensate errors. Only one normal vector of the voxel of maximum magnitude 21a is determined as the result.

Alternatively, in addition to a voxel of maximum magnitude 21b, only one voxel 22b adjacent in the X-direction and one voxel 24b adjacent in the Y-direction can be used. In this case, there is no redundancy. That is, the three phase values of the three voxels are used directly to calculate the normal vector.

Alternatively, in addition to a voxel of maximum magnitude 21c, diagonally adjacent voxels, that is, a voxel 26c adjacent in the X-direction and in the Y-direction and a voxel 29c adjacent in the X-direction and the Y-direction can be used. Also in the example presented here, there is no redundancy, so that the normal vector is determined on the basis of all of the three phase values.

Furthermore, all voxels 22d-29d adjacent in the X-direction, Y-direction and diagonally, which are arranged around a voxel of maximum magnitude 21d and the voxel of maximum magnitude 21d can be used for the determination of the normal vectors. In this case, there is a large over-determination of the normal vector. This over-determination is exploited as redundancy for the avoidance of measurement errors.

In the following, a corresponding angle calculation is shown only for the simple case, which is illustrated around the voxel 21a. Accordingly, $\Delta_x$: voxel spacing in the X-direction
$\Delta_y$: voxel spacing in the Y-direction
$\Delta_z$: voxel spacing in the Z-direction
$\Delta\rho_x$: phase difference between the voxels 22a and 23a
$\Delta\rho_y$: phase difference between the voxels 24a and 25a
$\lambda$: wavelength at the mid-frequency The following is therefore obtained $$\theta_x = \tan^{-1}\left(\Delta\rho_x \cdot \left(\frac{\lambda}{4\Pi}\right) \cdot \frac{1}{2\Delta x}\right)$$

$$\theta_y = \tan^{-1}\left(\Delta\rho_y \cdot \left(\frac{\lambda}{4\Pi}\right) \cdot \frac{1}{2\Delta y}\right)$$

In order to reduce the complexity of the calculation, the maximum angle of inclination of the surface investigated relative to the connecting line between the antenna arrangement and the object under investigation can also be specified. In this context:

$\theta_x^{max}$: maximum inclination in the X-direction
$\theta_y^{max}$: maximum inclination in the Y-direction Since $\Delta\rho_x$ and $\Delta\rho_y$ can each reach $2\pi$, optimal $\Delta_x$ and $\Delta_y$ are obtained if:

$$\Delta x \leq \frac{\lambda}{4} \cdot \frac{1}{\tan(\theta_x^{max})}$$

$$\Delta y \leq \frac{\lambda}{4} \cdot \frac{1}{\tan(\theta_y^{max})}$$

In order to avoid errors caused by ambiguities in the phase values, $$\Delta_z \leq \lambda/2$$

should apply in this context.

The accordingly determined angles $\theta x$ and $\theta y$ now only need to be converted into spherical coordinates. This is implemented as follows:

$$\Theta = \cos^{-1}\left(\frac{1}{\sqrt{(\tan\theta_x)^2 + (\tan\theta_y)^2 + 1}}\right)$$

$$\Phi = \tan^{-1}\left(\frac{\tan\theta_y}{\tan\theta_x}\right).$$

Now, in order to achieve an optimal display of the results, the spherical coordinates just determined are assigned to the coordinates in an HSV color space. The individual voxels of the surface are accordingly each displayed in the assigned color of the corresponding normal vector in the display unit 17 from FIG. 2. Accordingly, the inclination of the surface at the respective point can be immediately judged on the basis of the color. Sudden changes in the inclination of the surface can then be identified particularly readily.

Figure 4:
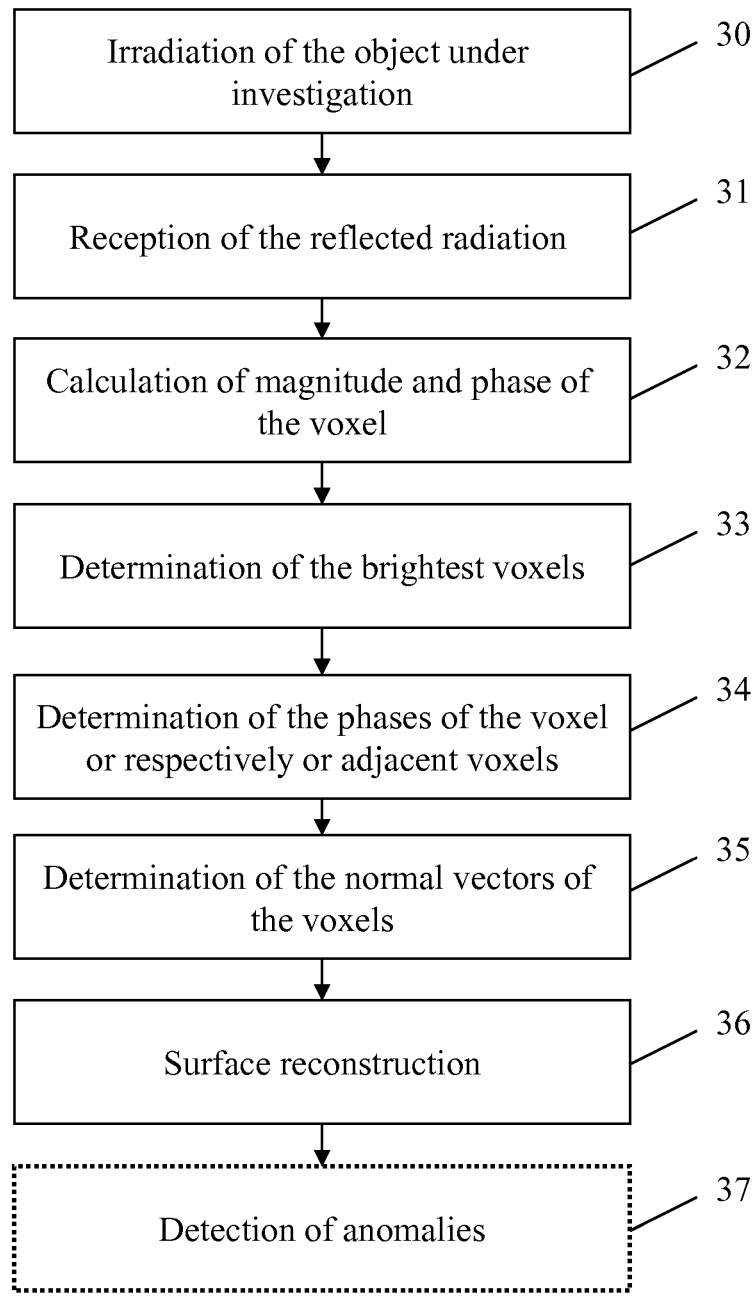
FIG. 4 an exemplary embodiment of the measurement method according to the invention.

With reference to FIG. 4, an exemplary embodiment of the method according to the invention is presented in the following. In a first step 30, an irradiation of the object under investigation is implemented with a measurement signal. In a second step 31, radiation reflected from the object under investigation is received. In a third step 32, magnitude and phase of all voxels of the object under investigation are calculated on the basis of the reflected radiation. In a fourth step 33, the voxels of maximum magnitude, that is, the brightest voxels, are determined for all voxels in each case with identical X-coordinate and respectively identical Y-coordinate, that is, in each case for a series of voxels along the Z-axis. These voxels are then determined as the surface of the object under investigation at this X-coordinate and this Y-coordinate. In a fifth step 34, the phases of the determined voxels of maximum magnitude and the phases of adjacent voxels are then determined. This is explained in greater detail with reference to FIG. 3. Following this, in a sixth step 35, the normal vector of the respective voxels of maximum magnitude is calculated on the basis of the determined phases. In a seventh step 36, a surface reconstruction is performed on the basis of the determined normal vectors and the spatial coordinates of the voxels of maximum magnitude. In an optional eighth step 37, a detection of surface anomalies is further implemented on the basis of the reconstructed surface and/or the determined phases.

The invention is not restricted to the illustrated exemplary embodiment. Accordingly, different frequencies of the measurement signals can be used. In particular, although they are preferred, microwave signals are not rigidly specified. Furthermore, an extremely diverse range of methods can be used to determine the magnitudes and phases of the individual voxels from the measured results. All of the features described above and/or features shown in the drawings and/or features claimed in the claims can be advantageously combined with one another arbitrarily within the scope of the invention.

The invention claimed is:

1. An apparatus for measuring a surface of an object, comprising:
    a measuring unit configured to transmit a measurement signal in a direction towards the object and to determine, based on a reflected signal resulting from the transmitted measurement signal, a plurality of voxels, wherein each voxel comprises a phase and a magnitude of the reflected signal and one or more spatial coordinates, wherein the spatial coordinates comprise a Z-axis, which corresponds to a depth within the object, and an X-axis and a Y-axis, which are disposed perpendicular to the Z-axis and to each other, and wherein the plurality of voxels comprises a plurality of series of voxels along the Z-axis, each series of voxels along the Z-axis having a same X-coordinate and a same Y-coordinate; and
    a surface-determining unit comprising (a) a magnitude-determining unit configured to determine a voxel of a maximum magnitude for each series of voxels along the Z-axis, (b) a phase-determining unit configured to determine, for each maximum magnitude voxel, phases of at least three voxels comprising the maximum magnitude voxel and voxels that are adjacent thereto, (c) an angle-determining unit configured to determine, for each maximum magnitude voxel, a normal vector based on the respective phases, and (d) a surface-reconstructing unit configured to determine the surface of the object based on the spatial coordinates of the voxels of maximum magnitude and the respective normal vectors.

2. The apparatus according to claim 1, wherein, for each maximum magnitude voxel, each adjacent voxel is adjacent in the X-direction, in the Y-direction or in a diagonal direction relative to the respective voxel of maximum magnitude.

3. The apparatus according to claim 1, wherein the at least three voxels comprise the maximum magnitude voxel and at least two voxels adjacent in one or more of the X-direction and the Y-direction.

4. The apparatus according to claim 1, wherein the phase-determining unit is configured to determine, for each maximum magnitude voxel, phases of at least four voxels comprising the maximum magnitude voxel and voxels that are adjacent thereto in one or more of the X-direction and the Y-direction.

5. The apparatus according claim 1, wherein the phase-determining unit is configured to determine, for each maximum magnitude voxel, phases of more than three voxels comprising the maximum magnitude voxel and voxels that are adjacent thereto, and the angle-calculating unit is configured to determine, for each maximum magnitude voxel, more than one provisional normal vector based on the respective determined phases and to determine the normal vector based on the respective provisional normal vectors.

6. The apparatus according to claim 1, further comprising:
    a display unit configured to display the determined surface of the object in color, wherein each direction of the normal vectors of all voxels of the surface is represented by a given color.

7. The apparatus according to claim 1, further comprising:
    a control unit configured to detect surface anomalies based on one or more of the determined surface of the object, and the determined phases.

8. The apparatus according to claim 1, wherein the determination of the normal vectors is based at least in part on previously specified maximum angles of inclination of the surface of the object.

9. A method for measuring a surface of an object, comprising:
    transmitting a measurement signal in a direction towards the object;
    determining a plurality of voxels based on a reflected signal resulting from the transmitted measurement signal, wherein each voxel comprises a phase and a magnitude of the reflected signal and one or more spatial coordinates, wherein the spatial coordinates comprise a Z-axis, which corresponds to a depth within the object, and an X-axis and a Y-axis, which are disposed perpendicular to the Z-axis and to each other, and wherein the plurality of voxels comprises a plurality of series of voxels along the Z-axis, each series of voxels along the Z-axis having a same X-coordinate and a same Y-coordinate;
    determining a voxel of a maximum magnitude for each series of voxels along the Z-axis;
    determining, for each maximum magnitude voxel, phases of at least three voxels comprising the maximum magnitude voxel and voxels that are adjacent thereto;
    determining, for each maximum magnitude voxel, a normal vector based on the respective phases;
    determining a reconstructed version of the surface of the object based on the spatial coordinates of the voxels of maximum magnitude and the respective normal vectors.

10. The method according to claim 9, wherein, for each maximum magnitude voxel, each adjacent voxel is adjacent in the X-direction, in the Y-direction or in a diagonal direction relative to the respective voxel of maximum magnitude.

11. The method according to claim 9, wherein the at least three voxels comprise the maximum magnitude voxel and at least two voxels adjacent in one or more of the X-direction and the Y-direction.

12. The method according to claim 9, wherein the phase-determining unit is configured to determine, for each maximum magnitude voxel, phases of at least four voxels comprising the maximum magnitude voxel and voxels that are adjacent thereto in one or more of the X-direction and the Y-direction.

13. The method according claim 9, wherein the determination of the phases comprises determining, for each maximum magnitude voxel, phases of more than three voxels comprising the maximum magnitude voxel and voxels that are adjacent thereto, and the determination of the normal vectors comprises determining, for each maximum magnitude voxel, more than one provisional normal vector based on the respective determined phases and to determine the normal vector based on the respective provisional normal vectors.

14. The method according to claim 9, further comprising:
displaying, on a display device, the determined surface of the object in color, wherein each direction of the normal vectors of all voxels of the surface is represented by a given color.

15. The method according to claim 9, further comprising:
detecting surface anomalies based on one or more of the determined surface of the object, and the determined phases.

16. The method according to claim 9, wherein the determination of the normal vectors is based at least in part on previously specified maximum angles of inclination of the surface of the object.

17. An apparatus comprising at least one processor and at least one memory including computer program code for one or more programs, wherein the at least one memory and the computer program code are configured to, with the at least one processor, cause the apparatus to perform a measurement of a surface of an object, by performing at least the following:
transmitting a measurement signal in a direction towards the object;
determining a plurality of voxels based on a reflected signal resulting from the transmitted measurement signal, wherein each voxel comprises a phase and a magnitude of the reflected signal and one or more spatial coordinates, wherein the spatial coordinates comprise a Z-axis, which corresponds to a depth within the object, and an X-axis and a Y-axis, which are disposed perpendicular to the Z-axis and to each other, and wherein the plurality of voxels comprises a plurality of series of voxels along the Z-axis, each series of voxels along the Z-axis having a same X-coordinate and a same Y-coordinate;
determining a voxel of a maximum magnitude for each series of voxels along the Z-axis;
determining, for each maximum magnitude voxel, phases of at least three voxels comprising the maximum magnitude voxel and voxels that are adjacent thereto;
determining, for each maximum magnitude voxel, a normal vector based on the respective phases;
determining a reconstructed version of the surface of the object based on the spatial coordinates of the voxels of maximum magnitude and the respective normal vectors.

* * * * *